Oct. 27, 1925. 1,559,221
V. CARPENTER
FLOWER RACK
Filed Feb. 21, 1925
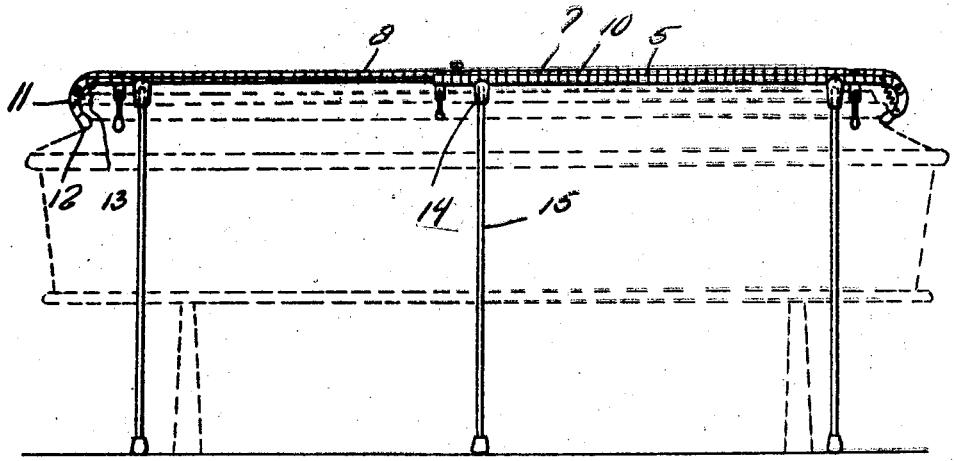
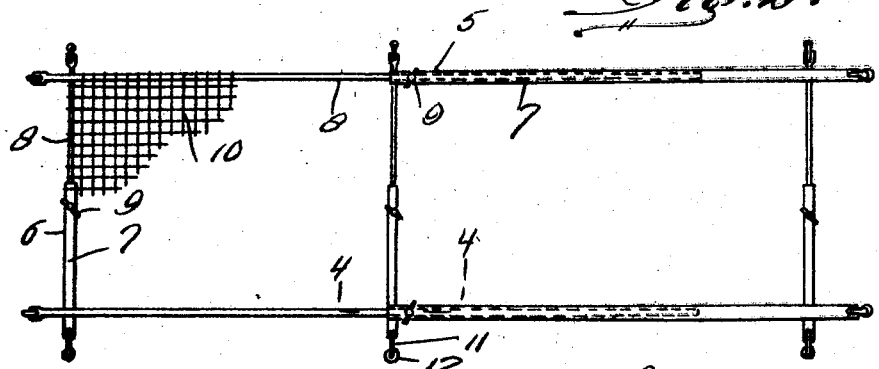
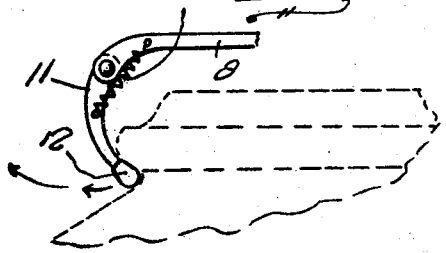
Inventor
Verl Carpenter, Patented Oct. 27, 1925.

1,559,221

UNITED STATES PATENT OFFICE.

VERL CARPENTER, OF LANCASTER, OHIO.

FLOWER RACK.

Application filed February 21, 1925. Serial No. 10,820.

*To all whom it may concern:*

Be it known that I, VERL CARPENTER, a citizen of the United States, residing at Lancaster, in the county of Fairfield and State of Ohio, have invented certain new and useful Improvements in a Flower Rack, of which the following is a specification.

The present invention relates to a flower rack and has for its principal object to provide a device for supporting flowers at a funeral.

Another important object of the invention is to provide a rack structure which may be supported on top of the casket so that the flowers may be arranged attractively thereon, and may be removed therefrom easily and quickly whenever it may become desirable.

Another important object of the invention is to provide a flower rack which embodies detachable legs in order that it may be set up in close proximity to the caskets when it is not desired to have the same resting thereon.

Another important object of the invention is to provide a flower rack which is adjustable so as to fit different size caskets and which possesses a knock-down structure in order that it may be conveniently stored away when not in use.

A still further object of the invention is to provide a rack of this nature which is strong, durable, and inexpensive to manufacture, one which will be found efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the rack embodying the features of my invention, Figure 2 is a top plan view thereof, Figure 3 is an enlarged detail view of one of the members for engaging the rack on a casket, and Figure 4 is an enlarged detail section taken on the line 4—4 of Figure 2.

Referring to the drawing in detail, it will be seen that the rack is in the form of a frame consisting of longitudinally disposed side members 5 and a plurality of cross members 6. Each member 5 and 6 includes a tubular bar 7 for slidably receiving a bar 8. These bars 7 and 8 may be held in different adjusted positions so as to vary the length of the members by set screw 9. A foraminous sheet 10 is engaged on the side and cross members and the bars 8 are slidable therethrough so that the length of each member 5 or 6 may be varied to conform with the sides of the casket. This rack frame is adapted to be disposed over the casket as is indicated to advantage in Figure 1, and the ends of the members 5 and 6 are provided with pivotally mounted engaging fingers 11 having rubber caps 12 or the like at their ends so that these ends will not mar the casket when in engagement therewith as is shown to advantage in Figure 3. Springs 13 are engaged between the pivoted fingers 11 and the members 5 and 6 so as to swing the fingers into resilient engagement with the casket.

The side and cross members 5 and 6 are provided with sockets 14 in which the upper ends of legs 15 may be seated so that the rack may be conveniently supported when not positioned on top of the casket.

It is thought that the construction and operation as well as the advantages of this flower rack will be clearly understood without a more detailed description thereof. The present embodiment of the invention has been disclosed merely by way of example and attains all the features of advantage enumerated as desirable in the statement of the invention and the above description, but it is desired to point out that numerous changes in the details of construction, in the materials, in the proportions, and in the combination and arrangement of parts may be resorted to without departing from the spirit or scope of the invention as hereinafter claimed or sacrificing any of its advantages.

Having thus described my invention, what I claim as new is:—

1. In a rack of the class described, a frame formed from a plurality of telescopic bars, fingers pivoted on the ends of the bars, and springs engaged between the fingers and the bars for tending to hold said fingers toward the casket or the like.

2. In a rack of the class described, a frame formed from a plurality of telescopic bars, fingers pivoted on the ends of the bars, and springs engaged between the fingers and the bars for tending to hold said fingers toward the casket or the like, and sockets formed on the bars for receiving the detachable legs.

3. A flower rack of the class described including a frame formed from a plurality of telescopic bars and a sheet of foraminous material mounted on the bars, curved fingers pivoted to the ends of the bars, springs between the fingers and the bars tending to hold said fingers in engagement with a casket or like support, sockets extending from the bars, and legs having their ends receivable in said sockets.

In testimony whereof I affix my signature.

VERL CARPENTER.